United States Patent
Murai et al.

(10) Patent No.: US 12,249,853 B2
(45) Date of Patent: Mar. 11, 2025

(54) CHARGE-DISCHARGE LOSS REDUCTION METHOD AND DEVICE UTILIZING POWER RECEIVER PRIORITY

(71) Applicants: NISSAN MOTOR CO., LTD., Yokohama (JP); RENAULT s.a.s., Boulogne-Billancourt (FR)

(72) Inventors: Kensuke Murai, Kanagawa (JP); Keigo Ikezoe, Kanagawa (JP); Kenta Suzuki, Kanagawa (JP)

(73) Assignees: NISSAN MOTOR CO., LTD., Yokohama (JP); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 18/276,614

(22) PCT Filed: Feb. 10, 2021

(86) PCT No.: PCT/IB2021/000081
§ 371 (c)(1),
(2) Date: Aug. 9, 2023

(87) PCT Pub. No.: WO2022/172043
PCT Pub. Date: Aug. 18, 2022

(65) Prior Publication Data
US 2024/0088677 A1    Mar. 14, 2024

(51) Int. Cl.
*H02J 7/00* (2006.01)
*B60L 53/14* (2019.01)
*B60L 58/12* (2019.01)

(52) U.S. Cl.
CPC ............ *H02J 7/0013* (2013.01); *B60L 53/14* (2019.02); *B60L 58/12* (2019.02); *H02J 2310/48* (2020.01)

(58) Field of Classification Search
None
See application file for complete search history.

(56) References Cited

U.S. PATENT DOCUMENTS 8,502,500 B2    8/2013  Baxter et al.
11,069,927 B2   7/2021  Yokoyama et al.
(Continued)

FOREIGN PATENT DOCUMENTS

CN    112193121 A    1/2021
EP    4 293 605 A1   12/2023
(Continued)

OTHER PUBLICATIONS

U.S. Appl. No. 18/276,560, filed Aug. 9, 2023, Nissan Motor Co., Ltd.; Renault S.A.S.
(Continued)

*Primary Examiner* — Bernard G Lindsay
(74) *Attorney, Agent, or Firm* — Foley & Lardner LLP

(57) ABSTRACT

A charge-discharge loss reduction device includes a power reception control device that controls power received or discharged by power receiving elements included in a load group, in a power system that supplies electric energy to the load group including the power receiving elements via a power supply base point. The power reception control device is configured to change a priority of an own power receiving element using a charge-discharge state of the own power receiving element, the priority indicating a degree to which power reception of the own power receiving element takes priority over power reception of another power receiving element.

3 Claims, 5 Drawing Sheets

(56) References Cited

U.S. PATENT DOCUMENTS

| | | | |
|---|---|---|---|
| 11,843,271 B2 | 12/2023 | Murai et al. | |
| 2011/0241647 A1 | 10/2011 | Hershey et al. | |
| 2012/0056583 A1* | 3/2012 | Gotz | B60L 53/14 320/109 |
| 2013/0057210 A1* | 3/2013 | Nergaard | B60L 53/11 320/109 |
| 2013/0119947 A1 | 5/2013 | Ishida et al. | |
| 2014/0035379 A1* | 2/2014 | Stevens | H02J 50/12 307/104 |
| 2015/0357854 A1 | 12/2015 | Watanabe | |
| 2016/0226268 A1* | 8/2016 | Okui | H02J 7/0014 |
| 2016/0274607 A1 | 9/2016 | Kudo et al. | |
| 2017/0010595 A1 | 1/2017 | Kawaguchi | |
| 2017/0018923 A1 | 1/2017 | Rombouts | |
| 2019/0275910 A1* | 9/2019 | Inoue | B60L 55/00 |
| 2022/0158470 A1 | 5/2022 | Murai et al. | |
| 2023/0140514 A1* | 5/2023 | De Boer | B60L 53/67 320/109 |

FOREIGN PATENT DOCUMENTS

| | | |
|---|---|---|
| JP | 2009-112148 A | 5/2009 |
| JP | 2011-217600 A | 10/2011 |
| JP | 2012-039685 A | 2/2012 |
| JP | 2012-257436 A | 12/2012 |
| JP | 2013-172537 A | 9/2013 |
| JP | 2014-090586 A | 5/2014 |
| JP | 5598896 B2 | 10/2014 |
| JP | 2015-057936 A | 3/2015 |
| JP | 2016-015875 A | 1/2016 |
| JP | 6168528 B2 | 7/2017 |
| JP | 2017-158363 A | 9/2017 |
| JP | 2018-064458 A | 4/2018 |
| JP | 2018-160821 A | 10/2018 |
| WO | WO-2020/194009 A1 | 10/2020 |
| WO | WO-2020/194010 A1 | 10/2020 |

OTHER PUBLICATIONS

U.S. Appl. No. 18/276,577, filed Aug. 9, 2023, Nissan Motor Co., Ltd.; Renault S.A.S.

U.S. Appl. No. 18/276,602, filed Aug. 9, 2023. Nissan Motor Co., Ltd.; Renault S.A.S.

* cited by examiner

|  | EV1(SOC:80%) LOW PRIORITY | EV2(SOC:20%) HIGH PRIORITY |
|---|---|---|
| INCREASE PRIORITY (DURING CHARGING) | 0.0001 | 0.0005 |
| INCREASE PRIORITY (DURING DISCHARGING) | 0.01 | 0.05 |
| DECREASE PRIORITY (DURING CHARGING) | 0.05 | 0.01 |
| DECREASE PRIORITY (DURING DISCHARGING) | 0.0005 | 0.0001 |

CHARGE-DISCHARGE LOSS REDUCTION METHOD AND DEVICE UTILIZING POWER RECEIVER PRIORITY

TECHNICAL FIELD

The present invention relates to a charge-discharge loss reduction method and a charge-discharge loss reduction device.

BACKGROUND ART

There is a prior known method of controlling the power consumption of each of a plurality of power consumption elements based on a limit for the total power consumption consumed by the entire group including the power consumption elements (Patent Literature 1). In Patent Literature 1, a broadcast transmission element broadcasts, to the group, a function of the difference between a current value for the total power consumption and a reference value for the total power consumption. Each power consumption element controls its own power consumption by using the function and the priority given to that element.

CITATION LIST

Patent Literature

Patent Literature 1: Japanese Patent No. 6168528

SUMMARY OF INVENTION

Technical Problem

When electric vehicles that perform charging and electric vehicles that perform discharging are mixed in a group, conversion loss related to charging and discharging occur. However, Patent Literature 1 does not include any description relating to such loss.

The present invention has been devised in consideration of the above problems, and an object of the present invention is to provide a charge-discharge loss reduction method and a charge-discharge loss reduction device capable of reducing conversion loss related to charging and discharging.

Solution to Problem

A charge-discharge loss reduction method according to an aspect of the present invention includes changing a priority of an own power receiving element using a charge-discharge state of the own power receiving element, the priority indicating a degree to which power reception of the own power receiving element takes priority over power reception of another power receiving element.

Advantageous Effects

According to the present invention, it becomes possible to reduce conversion loss related to charging and discharging.

DESCRIPTION OF EMBODIMENTS

Figure 1:
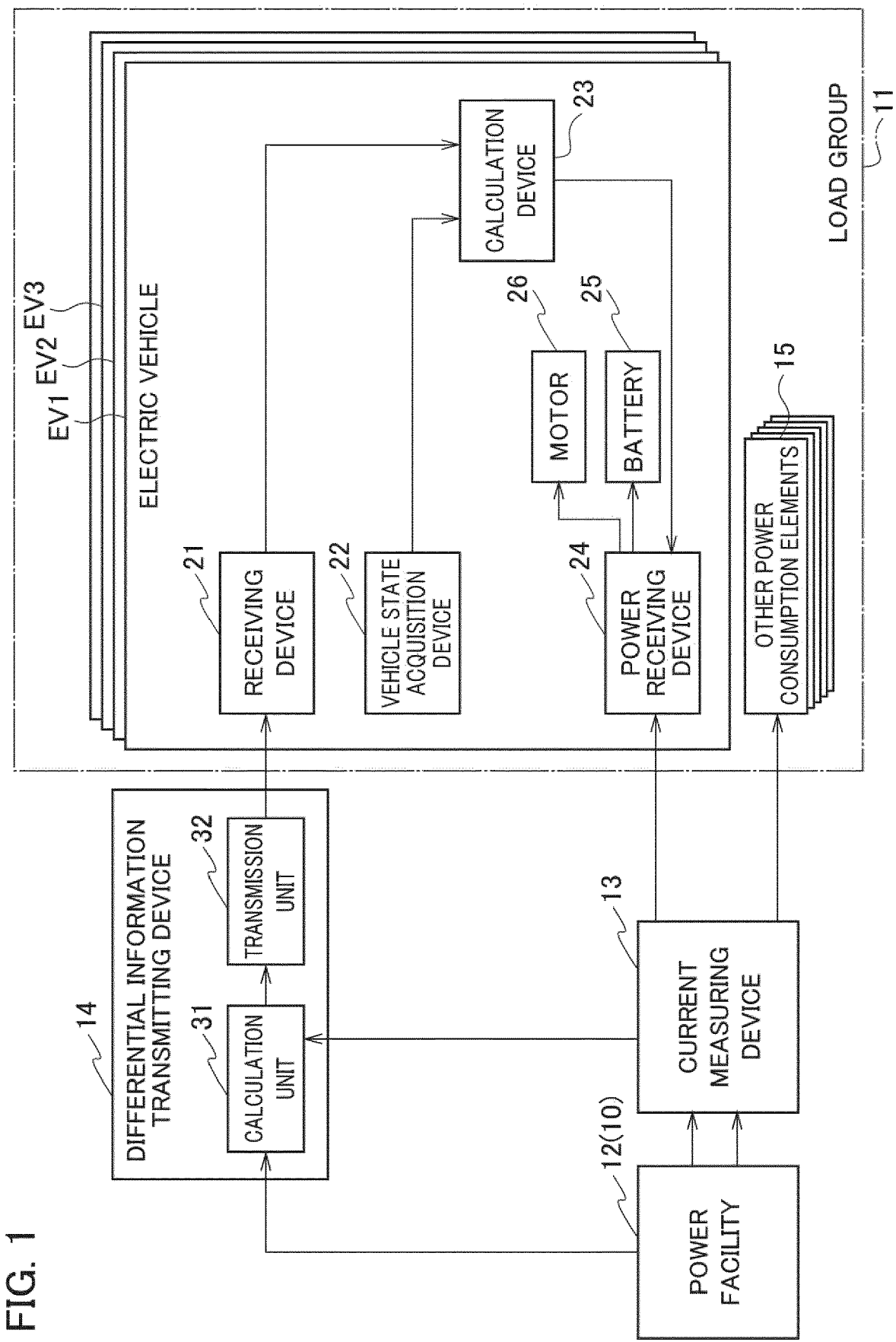
FIG. 1 is a schematic configuration diagram of a power system according to an embodiment of the present invention.

An embodiment of the present invention will be described below with reference to the drawings. In the illustrations of the drawings, the same parts are denoted with the same reference numerals, and the description thereof is omitted.

With reference to FIG. 1, the configuration of a power reception control device and peripheral devices thereof in an electric vehicle (an example of a power receiving element) according to the present embodiment will be described. In a power system that supplies electric energy to a load group 11 including a plurality of electric vehicles (EV1, EV2, EV3, and so forth) via a power facility 12 (an example of a power supply base point 10), the power reception control device controls an element received power, which is the power received by the electric vehicle EV1 included in the load group 11, by repeating a prescribed processing cycle.

The power reception control device has a receiving device 21 that receives electric signals from the outside, a vehicle state acquisition device 22 that acquires information indicating the state of the electric vehicle EV1, and a calculation device 23 that calculates the element received power of the electric vehicle EV1. The electric vehicle EV1 includes a power receiving device 24 that receives power from the outside, a battery 25 that stores the power (element received power) received by the power receiving device 24, and a motor 26 that is driven based on the electric energy or element received power stored in the battery 25.

The "processing cycle" includes processing steps of (a) to (e).

(a) The receiving device 21 acquires information indicating differential power ($\Delta P$) which is obtained by subtracting the current value (Pall_now) of the total transmission power transmitted to the entire load group 11 via the power facility 12, from the maximum value (Pall_max) of the total transmission power that can be transmitted to the entire load group 11 via the power facility 12.

(b) The calculation device 23 calculates a priority ($\beta$) of the electric vehicle EV1 indicating the degree to which power reception of the own vehicle (the electric vehicle EV1) is given priority over power reception of other electric vehicles (EV2, EV3, and so forth), based on a numerical value representing a request of the user of the electric vehicle EV1.

(c) The calculation device 23 calculates element differential power ($\beta \Delta P$) by multiplying the differential power ($\Delta P$) indicated by the acquired information, by the priority ($\beta$).

(d) The calculation device 23 updates the element received power (Pt+1) by adding the element differential power ($\beta \Delta P$) to the element received power (Pt) of the previous processing cycle.

(e) The calculation device 23 controls the electric vehicle EV1 to receive the updated element received power (Pt+1).

In the present embodiment, an "electric vehicle" is an example of a "power storage element" or a "power receiving element" that receives power transferred via the power facility 12. A power storage element stores received power in a battery (including secondary batteries, storage batteries, and rechargeable batteries). A "power storage element" includes all equipment and devices with batteries such as vehicles (including electric vehicles, hybrid vehicles, construction equipment, and agricultural equipment), railroad cars, playground equipment, tools, household products, and daily necessities.

A "power storage element" is an example of a "power receiving element" that receives power transferred via the power facility 12. A "power receiving element" includes a "power consumption element" that consumes received power without storing the power, in addition to the "power storage element". A "power consumption element" includes railroad cars, playground equipment, tools, household products, daily necessities, and the like. A "power consumption element" may include a battery, similar to an electric vehicle. In the case where the power received by an electric vehicle is not stored in a battery but is directly transferred to a motor and consumed as driving power of the motor, the electric vehicle is an example of a "power consumption element". In this way, the "power consumption element" includes all equipment and devices that consume received power without storing the power regardless of whether a battery is provided.

Both a "power storage element" and a "power receiving element" represent a constituent unit of power reception control performed by the power reception control device. That is, the power reception control according to the present embodiment is performed by using a power storage element or a power receiving element as a unit. The power reception control according to the present embodiment is performed independently and in parallel for each of the plurality of electric vehicles (EV1, EV2, EV3, and so forth), for example.

In the present embodiment, a power storage element is given as an example of a power receiving element, and an electric vehicle (EV) that travels by using electricity as an energy source and the motor 26 as a power source is given as an example of a power storage element. However, this is not intended to limit both the power receiving element and power storage element in the present invention to electric vehicles (EVs).

In the present embodiment, the "power facility 12" is an example of the power supply base point 10. The "power facility 12" includes the following <1> to <6>, for example.
<1>"Charging stations" for electric vehicles EV
<2>"Power transformation devices" installed in sites such as parking areas of residences, office buildings, commercial facilities, factories, or highways
<3>"Power plants" such as hydro, thermal, or nuclear power plants, or "substations" that convert generated power to prescribed voltages
<4> Various "distribution facilities" for distributing power transferred via substations
<5>"Wiring (including cables and feeders)" connecting between these devices or facilities
<6>"Virtual power plants (VPP)" that aggregate the energy of nearby small power storage elements and make them function as one large power plant In the present embodiment, a description will be given regarding an example in which the power reception control device is mounted on the electric vehicle EV1, but it goes without saying that the power reception control device may control the element received power of the electric vehicle EV1 from outside the electric vehicle EV1 by using a short-range radio communication technology such as short-range wireless, wireless LAN, and wireless WAN, or a mobile phone communication network.

In addition, the configuration of one electric vehicle EV1 among the plurality of electric vehicles (EV1, EV2, EV3, and so forth) included in the load group 11 is described as an example, but other electric vehicles (EV2, EV3, and so forth) included in the load group 11 also have the same configuration as the electric vehicle EV1.

The power reception control device controls the power received by the electric vehicle EV1 via the power facility 12. The electric vehicle EV1 has the power receiving device 24 called an on-board charger (OBC). The calculation device 23 controls the power received by the power receiving device 24 via the power facility 12. The power received by the power receiving device 24 is stored in the battery 25. Alternatively, the electric vehicle EV1 may not store the power received by the power receiving device in the battery 25 but directly transfer the power to the motor 26 as a driving source.

The power supplied to the electric vehicle EV1 via the power facility 12 is measured by a current measuring device 13. A power value measured by the current measuring device 13 is transmitted to a differential information transmitting device 14.

The electric energy is supplied to the plurality of electric vehicles (EV1, EV2, EV3, and so forth) included in the load group 11 via one power facility 12. In addition, the electric energy may be supplied not only to the plurality of electric vehicles (EV1, EV2, EV3, and so forth) but also to one or two or more other power consumption elements 15 included in the load group 11 via one power facility 12. The plurality of electric vehicles (EV1, EV2, EV3, and so forth) and one or two or more other power consumption elements 15 to which the electric energy is supplied via the power facility 12 form a group (the load group 11).

The current measuring device 13 measures the current value (Pall_now) of the total transmission power that is transmitted to all electric vehicles (EV1, EV2, EV3, and so forth) and other power consumption elements 15 that are included in one load group 11 via the power facility 12, in other words, the total transmission power of the load group 11 as a whole.

The total power capacity of the load group 11, that is, the maximum value (Pall_max) of the total transmission power that can be transmitted to the entire load group 11 via the power facility 12, is determined in advance. The power reception control device according to the present embodiment controls the element received power of the electric vehicle EV1 based on a limit for the maximum value (Pall_max) of the total transmission power. The power reception control device controls the receiving power of the electric vehicle EV1 such that the current value (Pall_now) of the total transmission power measured by the current measuring device 13 does not exceed the maximum value (Pall_max) of the power, for example. It is needless to say that the power reception control device may control the receiving power of the electric vehicle EV1 to allow the current value (Pall_now) of the total transmission power to temporarily exceed the maximum value (Pall_max) of the power. The maximum value (Pall_max) of the total transmission power may or may not be a fixed value. Within facilities such as office buildings, commercial facilities, factories, and highway parking areas, there are not only charging stations for electric vehicles EVs but also power-consuming devices in facilities such as lighting devices, air conditioning devices, and lifting devices. The maximum value of the total transmission power may vary depending on these facilities.

As shown in FIG. 1, in the present embodiment, the differential information transmitting device 14 is communicably connected to each of the power facility 12, the current measuring device 13, and the electric vehicle EV1 in a wired or wireless manner. The power facility 12 transmits an electric signal indicating the maximum value (Pall_max) of the total transmission power to the differential information transmitting device 14. The current measuring device 13 transmits an electric signal indicating the current value (Pall_now) of the measured total transmission power to the differential information transmitting device 14.

The differential information transmitting device 14 includes a calculation unit 31 and a transmission unit 32. The calculation unit 31 calculates the differential power (ΔP) by subtracting the current value (Pall_now) of the total transmission power from the maximum value (Pall_max) of the total transmission power as shown in formula (1). The transmission unit 32 transmits (broadcasts) an electric signal indicating the differential power (ΔP) to all electric vehicles (EV1, EV2, EV3, and so forth) included in the load group 11 by means of mobile communication. The electric signal indicating the differential power (ΔP) is received by the receiving device 21 and transferred to the calculation device 23. This enables the power reception control device to acquire information indicating the differential power (ΔP) which is obtained by subtracting the current value (Pall_now) of the total transmission power being transmitted to the entire load group 11 via the power facility 12, from the maximum value (Pall_max) of the total transmission power that can be transmitted to the entire load group 11 via the power facility 12.

[Formula 1]

$$\Delta P = P_{all\_max} - P_{all\_now} \quad (1)$$

The differential information transmitting device 14 uses the transmission unit 32 to transmit (broadcast) information indicating the differential power (ΔP) to the receiving devices 21 of all electric vehicles (EV1, EV2, EV3, and so forth) included in the load group 11 by means of by wireless communication. Alternatively, wired communication may be used to transmit information indicating the differential power (ΔP).

In the example shown in FIG. 1, the differential information transmitting device 14 may not have a receiving device that receives signals transmitted from each electric vehicle indicating the state of each electric vehicle, such as the state of charge (SOC) of the battery 25 or the time ($T_d$) at which power reception is to end. That is, it is sufficient if the differential information transmitting device 14 and each electric vehicle can communicate only in one direction from the differential information transmitting device 14 to each electric vehicle. Note that two-way communication is also possible.

The differential information transmitting device 14 may be a server connected to the power facility 12, the current measuring device 13, and the load group 11 via a computer network, for example. Alternatively, the differential information transmitting device 14 may be configured as a part of the power facility 12.

The vehicle state acquisition device 22 acquires information indicating the state of the electric vehicle EV1. The "state of the electric vehicle EV1" is a numerical value indicating a request of the user of the electric vehicle EV1, for example. The numerical value indicating a request of the user of the electric vehicle EV1 is the remaining time (T) until the time when the power reception of the electric vehicle EV1 is to end (the power reception end time $T_d$). The remaining time (T) can be calculated from the time when the electric vehicle EV1 is to end the power reception. The remaining time (T) is the remaining time during which the battery 25 of the electric vehicle EV1 can be charged.

Suppose that a user who has returned home starts charging the battery 25 of the electric vehicle EV1 in a parking space of his/her home and plans to go out by using the electric vehicle EV1 at 7:00 AM the next day. In the above case, a time that is a prescribed time period (5 minutes) before 7:00 AM the next day can be set as the power reception end time. In this way, the "user's request" to "go out at 7:00 AM the next day" represents the power reception end time (6:55 AM=$T_d$) and the remaining time (T) until the power reception end time. The "power reception end time ($T_d$)" means the time at which a time period during which the electric vehicle EV1 can continue receiving power is to end, and is distinguished from the time at which the user determines, in the power reception control flow (FIG. 2), to not continue power reception (NO in S03).

The power reception end time ($T_d$) may be a time that is actually set by the user using an information communication terminal such as a smartphone or a user interface mounted on the electric vehicle EV1. Alternatively, if there is no specific instruction or setting from the user, the time may be estimated from statistical data obtained by investigating the user's past behavior history (history of past departure times and the like).

The calculation device 23 calculates the priority (β) of the electric vehicle EV1, which indicates the degree to which power reception of the own EV1 is prioritized over power reception of other electric vehicles (EV2, EV3, and so forth), based on a numerical value indicating a request of the user of the electric vehicle EV1 (the state of the electric vehicle EV1). Specifically, the calculation device 23 calculates the priority (β) from the remaining time (T) from the current time ($T_o$) to the power reception end time ($T_d$) by using formula (2). In formula (2), N indicates the total number of electric vehicles that receive power in the load group 11.

[Formula 2]

$$\beta = \frac{1}{N \times (T_d - T_0)} \quad (2)$$

As shown in formula (2), the priority (β) is inversely proportional to the remaining time (T). As the remaining time (T) decreases, the priority (β) increases. Formula (2) is only an example, and the priority (β) may be inversely proportional to the "remaining time (T) raised to the power of g", which is the product of the remaining time (T) multiplied g times (g is a positive number) which is two or more times.

The total number (N) of electric vehicles may be statistical data (quantitative data) obtained by investigating the past history of power reception in the load group 11, or an approximate total number (N) of electric vehicles can be estimated from the current power value (Pall_now). The total number (N) is transmitted from the differential information transmitting device 14 or a device associated with the differential information transmitting device 14 in the same broadcast in the same manner as the differential power (ΔP). Alternatively, the total number (N) may be specified by using position information or an identification signal of a charging system.

As shown in formula (3), the calculation device 23 calculates the element differential power (βΔP) by multiplying the differential power (ΔP) by the priority (β), and updates the elemental receiving power (Pt+1) by adding the element differential power (βΔP) to the elemental receiving power (Pt) of the previous processing cycle. Note that the subscript (lower-right characters) "t" and "t+1" of the symbol "P" indicating the elemental receiving power indicates the number of repetitions of the "processing cycle", and t is a positive integer including zero.

[Formula 3]

$$P_{t+1} = P_t + \beta \cdot \Delta P \tag{3}$$

The calculation device 23 transmits an instruction signal to the power receiving device 24 such that the power receiving device 24 receives the updated element received power (Pt+1), and the power receiving device 24 that has received the instruction signal receives the updated element received power (Pt+1) via the power facility 12.

The power reception control device controls power (element received power Pt) received by the power receiving device 24 of the electric vehicle EV1 by repeatedly performing a "processing cycle" including processing steps of (a) to (e) at fixed periods.

Figure 2:
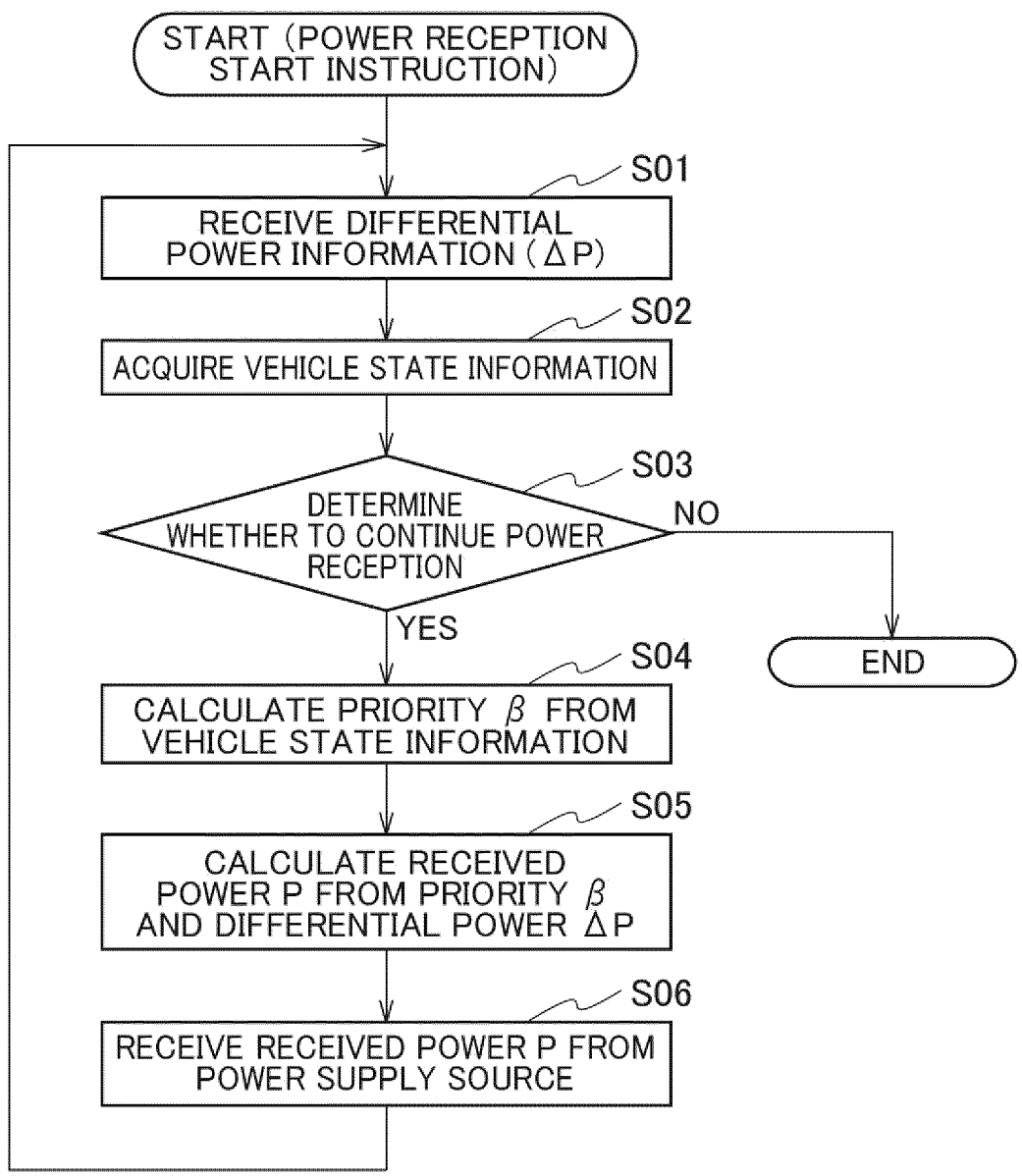
FIG. 2 is a flowchart for explaining an operation example of a power reception control device.

Next, an example (a basic example) of a power receiving control method performed by the power reception control device shown in FIG. 1 will be described with reference to the flowchart of FIG. 2. A person skilled in the art can easily understand the specific procedure of the power receiving processing method performed by the power reception control device from the description of the specific configuration and functions of the power reception control device shown in FIG. 1. Therefore, the main processing operation of the power reception control device is described here as the power receiving processing method performed by the power reception control device shown in FIG. 1, and descriptions of detailed processing operations will be omitted because they overlap with the descriptions made with reference to FIG. 1.

First, in step S01, the receiving device 21 acquires information indicating the differential power (ΔP) calculated by the calculation unit 31. Processing proceeds to step 502, and the vehicle state acquisition device 22 acquires information indicating the power reception end time ($T_d$) as an example of information indicating the state of the electric vehicle EV1.

Processing proceeds to step S03, and the power reception control device determines whether to continue power reception. For example, if the device receives an instruction signal to end power reception from the user of the electric vehicle EV1 (NO in S03), or if the current time reaches the power reception end time ($T_d$), the device ends the continuation of power reception. Alternatively, if an unconnected charging port is detected (NO in S03), the device ends the continuation of power reception within a few minutes since there is an increase in the possibility that the electric vehicle EV1 will start moving. Further, if the state of charge (SOC) of the battery 25 reaches a target value (NO in S03), the device ends the continuation of power reception. If these situations do not arise (YES in S03), the power reception control device continues power reception.

Processing proceeds to step S04, and the calculation device 23 calculates the priority (β) of the electric vehicle EV1 from the power reception end time ($T_d$) by using formula (2). Processing proceeds to step S05, and the calculation device 23 updates the element received power (Pt+1) by substituting the differential power (ΔP) and priority (β) into formula (3).

Processing proceeds to step S06, and the calculation device 23 controls the power receiving device 24 such that the power receiving device 24 receives the updated element received power (Pt+1). The power reception control device controls the element received power (P) by repeatedly performing the processing cycle with steps S01 to S06 as a unit until NO is determined in step S03.

When the element received power (Pt+1) is updated, the updated element received power (Pt+1) may be corrected by subtracting a certain power correction value (αPt) from the previous element received power (Pt). This makes it difficult for the differential power (ΔP) to reach zero. This enables an electric vehicle to start receiving power at an early stage in the case where it is desired for the electric vehicle to start receiving power anew.

Next, an example of a charge-discharge reduction method will be described with reference to FIGS. 3 to 6.

First, a comparative example will be described with reference to FIG. 3. The comparative example described here is a case in which the charge-discharge reduction method according to the present embodiment is not used.

Figures 3, 4:
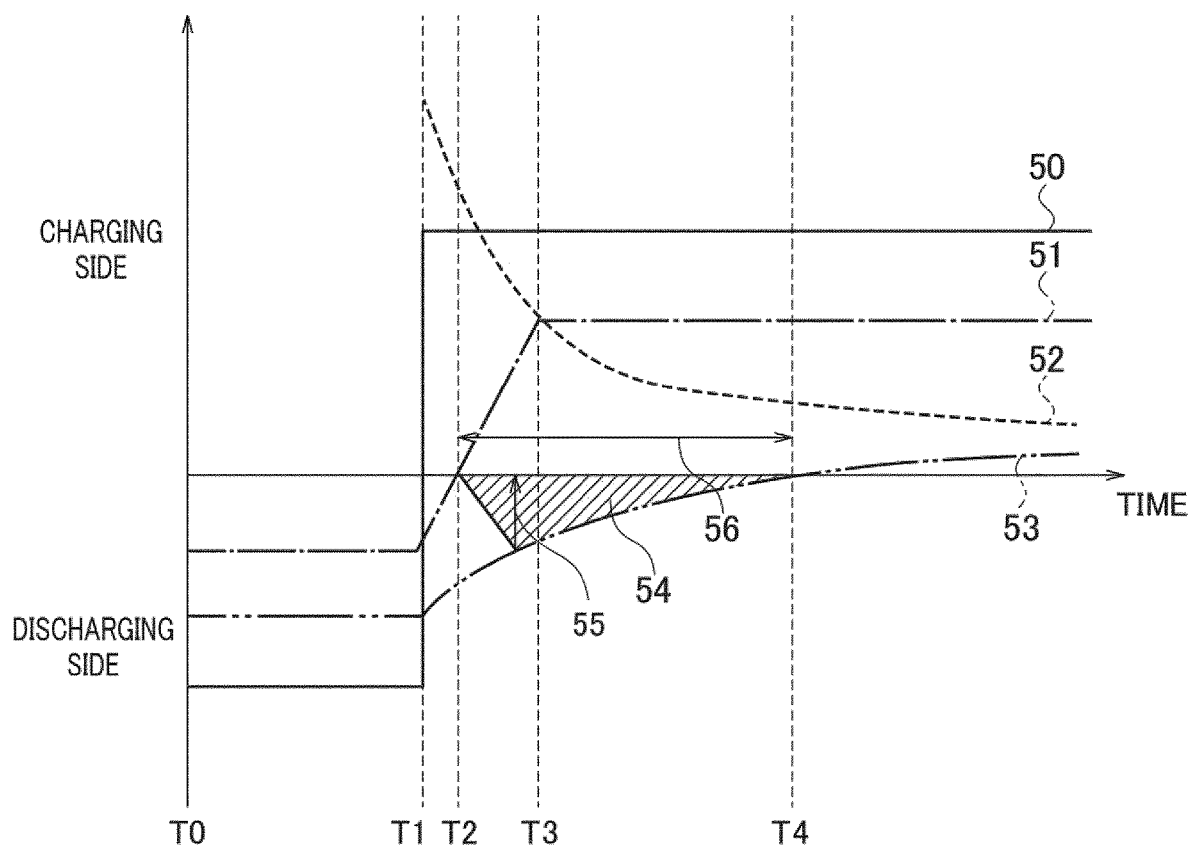
FIG. 3 is a graph for explaining a comparative example.
FIG. 4 is a diagram for explaining an example of a method of changing priorities.

In the vertical axis of FIG. 3, the upper side is a charge-side and the lower side is a discharge-side. The horizontal axis indicates times. Reference numeral 50 indicates the available power. Reference numeral 51 indicates the power of EV2. Reference numeral 52 indicates the available residual power. Reference numeral 53 indicates the power of EV1. Reference numerals 54 to 56 will be described later. The SOC of EV1 is 80% and the SOC of EV2 is 20%. Therefore, the priority (β) of EV2 is higher than the priority (β) of EV1 (β).

Between times T0 and T1, a signal transmitted from the differential information transmitting device 14 is negative. That is, the differential power (ΔP) is negative. Between times T0 and T1, EV1 and EV2 perform discharging. At time T1, the positive and negative of the signal transmitted from the differential information transmitting device 14 are reversed. That is, the differential power (ΔP) is positive. At time T1, EV1 and EV2 start charging. Between times T1 and T2, EV2 performs charging while reducing the discharge amount. Thereafter, at time T2, EV2 performs only charging. At or after time T3, EV2 performs charging with constant power. Similarly, between times T1 to T4, EV1 performs charging while reducing the discharge amount. Thereafter, at time T4, EV1 performs only charging.

Since EV2 has a higher priority than EV1, the charging speed of EV2 is faster and the charging speed of EV1 is slower. That is, between times T1 to T3, the slope of reference numeral 51 (EV2) is large and the slope of reference numeral 53 (EV1) is small. In other words, EV2 has a faster charging response compared to EV1.

Between times T2 to T4, while EV2 only performs charging, EV1 performs both charging and discharging. Hereinafter, "charging and discharging" may be referred to as "charging-discharging". Between times T2 to T4, EV2 performs charging by using the power discharged by EV1. Between times T2 to T4, EV1 repeatedly performs charging and discharging, and conversion loss related to charging-discharging occurs. The conversion loss is loss related to AC-DC conversion or loss related to DC-AC conversion, for example. Hereinafter, "conversion loss related to charging-discharging" is referred to as "charge-discharge loss". The size of the charge-discharge loss is the size of the area indicated by reference numeral 54. The size of the area 54 is determined by the height indicated by reference numeral 55 and the length indicated by reference numeral 56. The height 55 is determined by the charging speed of EV2 and the discharging speed of EV1. The height 55 increases when the increase in the charging speed of EV2 is fast (large slope) and the decrease in the discharging speed of EV1 is small (small slope), for example. The length 56, similar to the height 55, is also determined by the charging speed of EV2 and the discharging speed of EV1. The length 56 increases if the increase in the charging speed of EV2 is fast (large slope) and the decrease in the discharging speed of EV1 is small (small slope), for example.

In the present embodiment, in order to reduce the charge-discharge loss (the area 54), the power reception control device changes its own priority using its own charge-discharge state. Specifically, when the own electric vehicle is performing charging, the power reception control device decreases the increase priority compared to when the vehicle is performing discharging. The increase priority means the priority when the signal transmitted from the differential information transmitting device 14 is positive. When the own electric vehicle is performing discharging, the power reception control device reduces the decrease priority compared to when the vehicle is performing charging. The decrease priority means the priority when the signal transmitted from the differential information transmitting device 14 is negative. Specific examples of the increase priority and decrease priority will be described with reference to FIG. 4.

As shown in FIG. 4, the increase priority includes two priorities that are a priority during charging and a priority during discharging. Here, during charging or during discharging means that "the own vehicle" is performing charging or discharging. In the present embodiment, the own electric vehicle may not know the state (charge-discharge state) of another electric vehicle. What the own electric vehicle can only know is that the "the own vehicle" is performing charging or discharging. First, EV1 will be described. As described above, the SOC of EV1 is 80%. Further, the priority of EV1 is lower than the priority of EV2. When EV1 is performing charging, the power reception control device decreases the increase priority compared to when EV1 is performing discharging. That is, the increase priority is from 0.01 to 0.0001. Meanwhile, when EV1 is performing discharging, the power reception control device reduces the decrease priority compared to when EV1 is performing charging. That means the decrease priority is from 0.05 to 0.0005.

Next, EV2 will be described. As described above, the SOC of EV2 is 20%. Further, the priority of EV2 is higher than the priority of EV1. When EV2 is performing charging, the power reception control device decreases the increase priority compared to when EV2 is performing discharging. That is, the increase priority is from 0.05 to 0.0005. Meanwhile, when EV2 is performing discharging, the power reception control device reduces the decrease priority compared to when EV2 is performing charging. That is, the decrease priority is from 0.01 to 0.0001.

Figure 5:
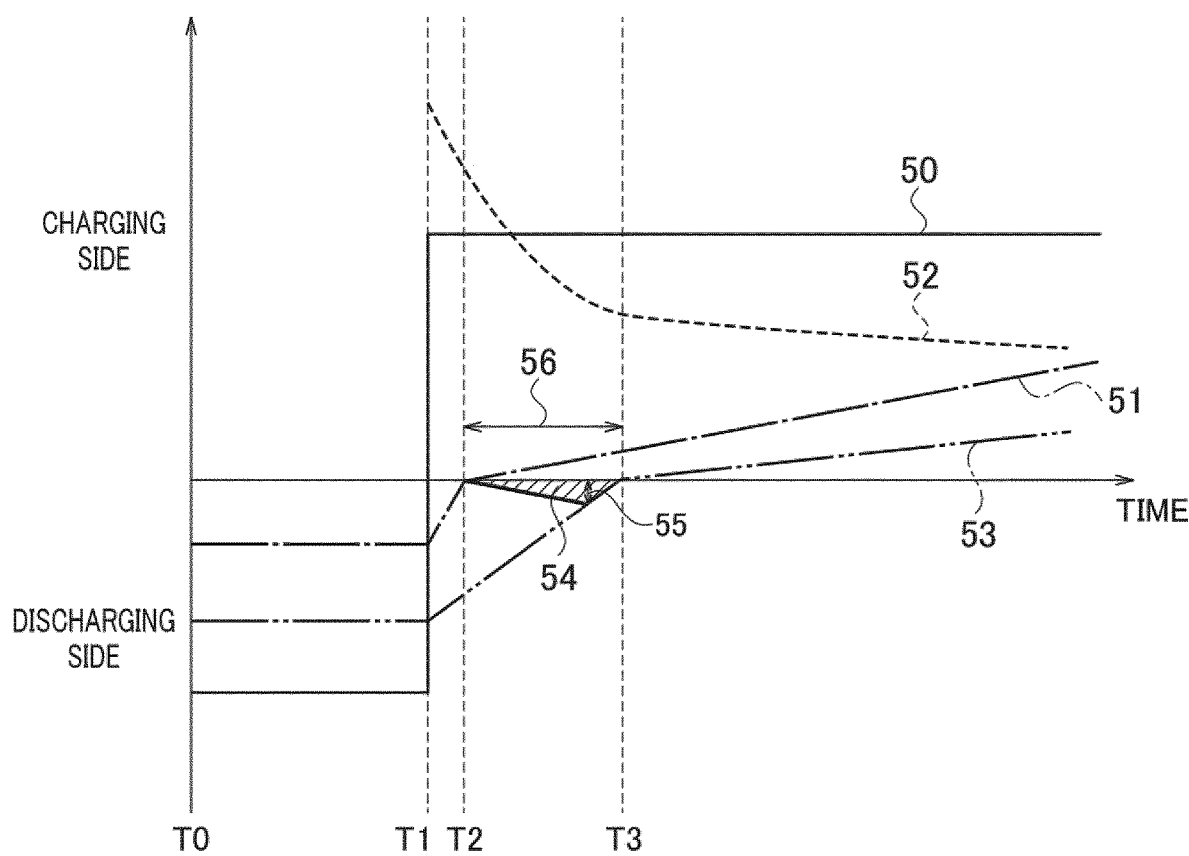
FIG. 5 is a graph for explaining reduction of charge-discharge loss.

Next, the effect due to the change in the priority will be described with reference to FIG. 5. Between times T2 and T3, the signal transmitted from the differential information transmitting device 14 is positive. Therefore, the increase priority in FIG. 4 is used. Between times T2 and T3, EV2 is performing charging and EV1 is performing discharging. Therefore, the increase priority of EV2 is 0.0005 and the increase priority of EV1 is 0.01. By changing the priority using the own charge-discharge state in this way, the increase priority of EV1 becomes higher than the increase priority of EV2 between times T2 and T3. As a result, as shown in FIG. 5, an increase in the charge amount of EV2 decreases, while the discharge amount of EV1 decreases significantly. This results in a smaller height 55 and length 56 and a smaller area 54 compared to those in the comparative example in FIG. 3. That is, the period during which EV1 repeats charging and discharging becomes shorter compared to that in the comparative example in FIG. 3. This reduces the charge-discharge loss.

A description will be given regarding another operation example when the signal transmitted from the differential information transmitting device 14 is positive. When the signal transmitted from the differential information transmitting device 14 is positive, the electric vehicle increases the charge amount while reducing the discharge amount. A description will be given regarding the case where EV1 is performing charging and EV2 is also performing charging. To reiterate, an electric vehicle can only know its own charge-discharge state. EV2 is charged preferentially because the priority (0.0005) of EV2 is higher than the priority (0.0001) of EV1. The charge amount of EV2 is greatly increased. Next, a description will be given regarding the case where EV1 is performing discharging and EV2 is also performing discharging. Since the priority (0.05) of EV2 is higher than the priority (0.01) of EV1, the discharge of EV2 is preferentially canceled. The discharge amount of EV2 is greatly reduced. Next, a description will be given regarding the case where EV1 is performing discharging and EV2 is performing charging. Since the priority (0.01) of EV1 is higher than the priority (0.0005) of EV2, the increase in the charge amount of EV2 is reduced, while the discharge amount of EV1 is greatly reduced. The discharge release of EV1 takes priority over the increase in the EV2 charge.

Next, a description will be given regarding another example of operation when the signal transmitted from the differential information transmitting device 14 is negative. When the signal transmitted from the differential information transmitting device 14 is negative, the electric vehicle increases the discharge amount while decreasing the charge amount. A description will be given regarding the case where EV1 is performing charging and EV2 is also performing charging. Since the priority (0.05) of EV1 is higher than the priority (0.01) of EV2, the charge amount of EV1 is greatly reduced. EV2 operates to maintain charging. Next, a description will be given regarding the case where EV1 is performing discharging and EV2 is also performing discharging. Since the priority (0.0005) of EV1 is higher than the priority (0.0001) of EV2, the discharge amount of EV1 is greatly increased. EV2 operates so as not to increase the discharge amount. Next, a description will be given regarding the case where EV1 is performing discharging and EV2 is performing charging. Since the priority (0.01) of EV2 is higher than the priority (0.0005) of EV1, an increase in the charge amount of EV2 becomes greater, while the decrease in the discharge amount of EV1 becomes smaller. The charge release of EV2 takes priority over the increase in EV1 discharge.

Operations and Effects

As described above, in accordance with the power reception control device according to the present embodiment, it is possible to obtain the following operations and effects.

The power reception control device changes a priority ($\beta$) of an own power receiving element, which indicates the degree to which power reception of the own power receiving element takes priority over power reception of other power receiving elements, by using the charge-discharge state of the own power receiving element. This reduces the charge-discharge loss.

In addition, the power reception control device acquires information indicating the differential power ($\Delta P$) obtained by subtracting the current value of the total transmission power transmitted to the entire load group 11 via the power supply base point 10, from the maximum value of the total transmission power that can be transmitted to the entire load group 11 via the power supply base point 10. If the information indicating the differential power ($\Delta P$) is a positive value and the own power receiving element is performing charging, the power reception control device reduces the priority compared to the case where the own power receiving element is performing discharging. If the information indicating the differential power ($\Delta P$) is a negative value and the own power receiving element is performing discharging, the power reception control device reduces the priority compared to the case where the own power receiving element is performing charging. This reduces the area 54 as shown in FIG. 5 and shortens the period during which EV1 repeats charging and discharging. This reduces the charge-discharge loss.

Modified Example

A modified example will be described next. According to the above embodiment, the charge-discharge loss is reduced as shown in FIG. 5. However, as shown in FIG. 5, the responsiveness when EV2 is performing charging is reduced and it sometimes takes time to reach the target power. Therefore, in the modified example, the power reception control device estimates whether there is an electric vehicle which is performing discharging among electric vehicles connected to the power system. In the above embodiment, it has been described that an own electric vehicle may not know the charge-discharge state of other electric vehicles. Therefore, in the modified example, a method such as estimating is adopted. If it is estimated that there is an electric vehicle that is performing discharging, the responsiveness is the same as that in the above embodiment. Meanwhile, if it is estimated that there is no electric vehicle that is performing discharging, the power reception control device makes the responsiveness greater than that in the above embodiment.

In the modified example, the charge-discharge power amount of the own vehicle is adjusted. This informs other electric vehicles whether the state of the own vehicle is a charged state or a discharged state by using the differential power ($\Delta P$). Therefore, the method of changing the power and how detection is performed based on the differential power ($\Delta P$) are paired. Whether there is an electric vehicle that is performing charging does not need to be a 0/1 estimate such as "exists" or "does not exist", but may be an estimate such whether the number of the vehicles is large or small. In addition, the following estimation method shows a case where the differential power ($\Delta P$) is positive, but when the differential power ($\Delta P$) is negative, charging and discharging may be switched.

Next, an example of the estimation method will be described. The differential power ($\Delta P$) is positive. An electric vehicle that is performing discharging changes the differential power ($\Delta P$) each time the differential power ($\Delta P$) is transmitted, and an electric vehicle that is performing charging changes the differential power ($\Delta P$) once every few times. If the differential power ($\Delta P$) changes each time the power is transmitted, the power reception control device can estimate that there is an electric vehicle that is performing discharging. If the differential power ($\Delta P$) does not change each time the power is transmitted, the electric vehicle that is performing charging is operated four out of five times to increase the response frequency. As a result, if there is an electric vehicle that is performing discharging, the response frequency of the electric vehicle that is performing charging decreases and thereby the amount of increase in charge decreases, and power is supplied preferentially to the electric vehicle that is performing discharging.

Figure 6:
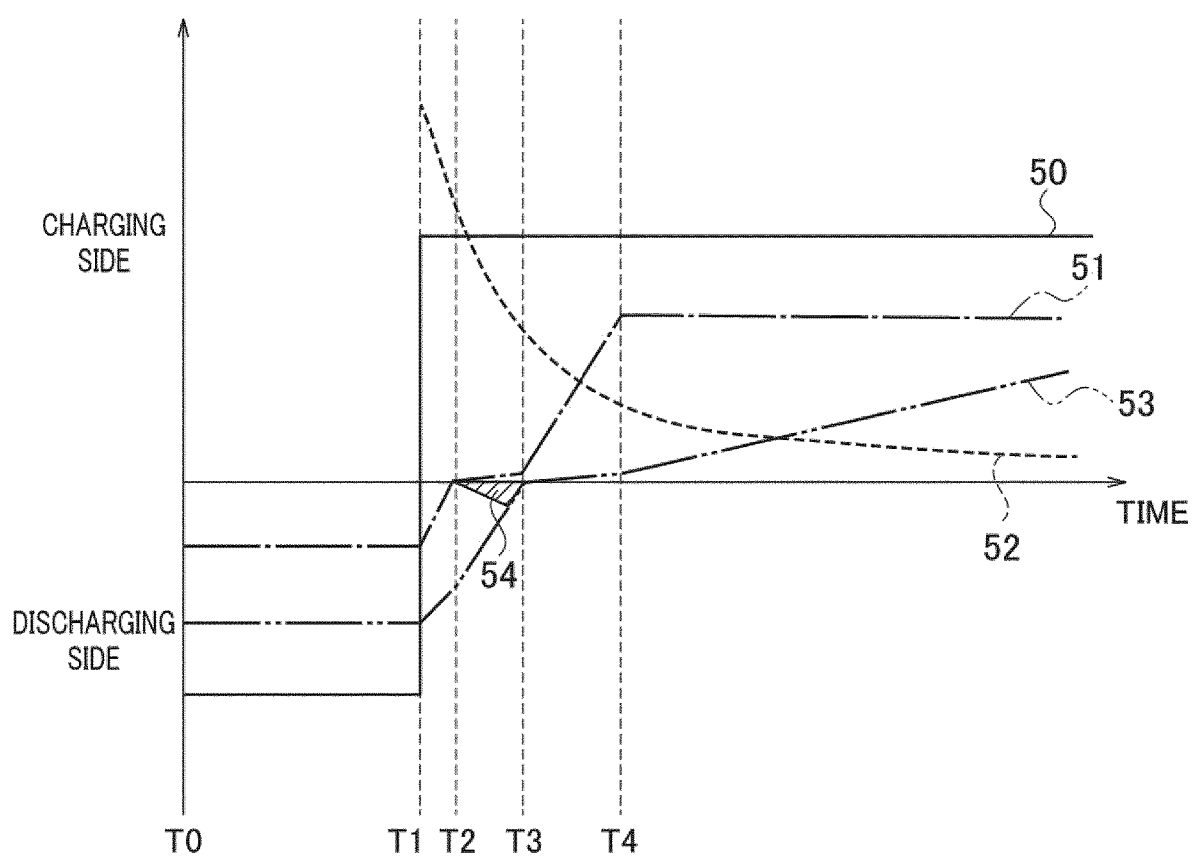
FIG. 6 is a graph for explaining enhancement of responsiveness.

As an alternative estimation method, the amount of change in power of an electric vehicle that performs charging may be reduced to about $\frac{1}{10}$ of the amount of change in power of an electric vehicle that performs discharging. This reveals that the number of electric vehicles performing discharging is large when the amount of change in the differential power ($\Delta P$) is small. The power reception control device estimates the overall responsiveness by using the rate of change in the differential power ($\Delta P$) and corrects the rate of change determined by the own priority. This makes it possible to increase the charging speed to the normal speed by the effect of the correction when only an electric vehicle that is performing charging is present, as shown in FIG. 6. At time T3 in FIG. 6, only an electric vehicle that is performing charging is present. It can be seen that the responsiveness of EV2 is enhanced at or after time T3.

The power reception control device estimates whether there is a power receiving element that is performing discharging among power receiving elements connected to the power system based on the rate of change of the information indicating the differential power ($\Delta P$). Suppose that the information indicating the differential power ($\Delta P$) is a positive value, the own power receiving element is performing charging, and it is estimated that there is a receiving element that is performing discharging. In the above case, the power reception control device reduces the increase in power received by the own power receiving element from the normal increase in power. Suppose that the information indicating the differential power ($\Delta P$) is a negative value, the own power receiving element is performing discharging, and it is estimated that there is a power receiving element that is performing discharging. In the above case, the power reception control device reduces the increase in power discharged by the own power receiving element from the normal increase in power. This reduces the charge-discharge loss and enables charging to be completed by the time desired by the user.

The normal amount of increase is defined as the amount of increase when it is not estimated whether there is a receiving element that is performing discharging.

Each of the functions described in the above embodiment can be implemented by one or more processing circuits. A processing circuit includes a programmed processing device such as a processing device including an electrical circuit. A processing circuit also includes devices such as an application specific integrated circuit (ASIC) and circuit components arranged to execute the described functions.

Although the embodiment of the invention has been described as described above, the discussion and drawings forming part of this disclosure should not be construed as limiting the invention. Various alternative embodiments, examples, operational techniques will be apparent to those skilled in the art from this disclosure.

REFERENCE SIGNS LIST

10 Power supply base point
11 Load group

13 Current measuring device
14 Differential information transmitting device
15 Power consumption element
21 Receiving device
22 Vehicle state acquisition device
23 Calculation device
24 Power receiving device
25 Battery
26 Motor
31 Calculation unit
32 Transmission unit

The invention claimed is:

1. A charge-discharge loss reduction method of controlling power received or discharged by power receivers included in a load group, in a power system that supplies electric energy to the load group including the power receivers via a power supply base point, the charge-discharge loss reduction method comprising:
changing a priority of a power receiver based on whether the power receiver is performing charging or discharging, the priority indicating a degree to which power reception of the power receiver takes priority over power reception of another power receiver;
charging or discharging the power receiver with an amount of power, the amount of power determined based on an equation that includes a value of the priority;
acquiring information indicating differential power obtained by subtracting a current value of total transmission power transmitted to an entirety of the load group via the power supply base point, from a maximum value of the total transmission power transmittable to the entirety of the load group via the power supply base point;
upon the information indicating the differential power being a positive value, reducing the priority in a case where the power receiver is performing charging, compared to a case where the power receiver is performing discharging; and
upon the information indicating the differential power being a negative value, reducing the priority in a case where the power receiver is performing discharging, compared to a case where the power receiver is performing charging.

2. The charge-discharge loss reduction method according to claim 1, comprising:
estimating whether a power receiver performing discharging is present among the power receivers connected to the power system, based on a rate of change of the information indicating the differential power;
upon the information indicating the differential power being a positive value, reducing an increase in an amount of power received by the power receiver from a normal increase in the amount of power in a case where the power receiver is performing charging and it is estimated that the power receiver performing discharging is present; and
upon the information indicating the differential power being a negative value, reducing an increase in an amount of power discharged by the power receiver from a normal increase in the amount of power in a case where the power receiver is performing discharging and it is estimated that the power receiver performing discharging is present, wherein the normal increase in the amount of power is defined as an increase in the amount of power in a case where it is not estimated whether the power receiver performing discharging is present.

3. A charge-discharge loss reduction device including a power reception control device that controls power received or discharged by power receivers included in a load group, in a power system that supplies electric energy to the load group including the power receivers via a power supply base point, wherein
the power reception control device is configured to:
change a priority of a power receiver based on the power receiver is performing charging or discharging, the priority indicating a degree to which power reception of the power receiver takes priority over power reception of another power receiver;
charge or discharge the power receiver with an amount of power, the amount of power determined based on an equation that includes a value of the priority;
acquire information indicating differential power obtained by subtracting a current value of total transmission power transmitted to an entirety of the load group via the power supply base point, from a maximum value of the total transmission power transmittable to the entirety of the load group via the power supply base point;
upon the information indicating the differential power being a positive value, reduce the priority in a case where the power receiver is performing charging, compared to a case where the power receiver is performing discharging; and
upon the information indicating the differential power being a negative value, reduce the priority in a case where the power receiver is performing discharging, compared to a case where the power receiver is performing charging.

* * * * *